United States Patent
Inoda et al.

(10) Patent No.: US 10,626,765 B2
(45) Date of Patent: Apr. 21, 2020

(54) EXHAUST GAS PURIFICATION DEVICE

(71) Applicant: CATALER CORPORATION, Kakegawa-shi, Shizuoka (JP)

(72) Inventors: Satoru Inoda, Kakegawa (JP); Yasutaka Nomura, Kakegawa (JP); Junji Kuriyama, Kakegawa (JP); Naoto Miyoshi, Nagoya (JP); Masahiko Takeuchi, Toyota (JP); Akemi Sato, Toyota (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/090,723

(22) PCT Filed: Mar. 21, 2017

(86) PCT No.: PCT/JP2017/011150
§ 371 (c)(1),
(2) Date: Oct. 2, 2018

(87) PCT Pub. No.: WO2017/175574
PCT Pub. Date: Oct. 12, 2017

(65) Prior Publication Data
US 2019/0120104 A1    Apr. 25, 2019

(30) Foreign Application Priority Data
Apr. 7, 2016   (JP) .................. 2016-077475

(51) Int. Cl.
*F01N 3/022*       (2006.01)
*F01N 3/035*       (2006.01)
(Continued)

(52) U.S. Cl.
CPC ......... *F01N 3/022* (2013.01); *B01D 53/9454* (2013.01); *B01D 53/9472* (2013.01);
(Continued)

(58) Field of Classification Search
None
See application file for complete search history.

(56) References Cited

U.S. PATENT DOCUMENTS

| | | |
|---|---|---|
| 2009/0087365 A1 | 4/2009 | Klingmann et al. |
| 2011/0030346 A1 | 2/2011 | Neubauer et al. |
| | (Continued) | |

FOREIGN PATENT DOCUMENTS

| | | |
|---|---|---|
| EP | 3 205 388 A1 | 8/2017 |
| JP | 2007-185571 A | 7/2007 |
| | (Continued) | |

OTHER PUBLICATIONS

Nakamura et al. JP2012240007A—translated document (Year: 2012).*
(Continued)

*Primary Examiner* — Walter D. Griffin
*Assistant Examiner* — Jelitza M Perez
(74) *Attorney, Agent, or Firm* — Oliff PLC (57) ABSTRACT

An exhaust gas purification device includes: a substrate of wall-flow structure having an inlet cell, an outlet cell and a porous partition wall; an upstream catalyst layer provided inside the partition wall and disposed in an upstream portion, including an exhaust gas inflow end section, of the substrate; and a downstream catalyst layer provided inside the partition wall and disposed in a downstream portion, including an exhaust gas outflow end section, of the substrate. The downstream catalyst layer contains a carrier, and Rh supported on the carrier. The upstream catalyst layer contains a carrier, and Pd and/or Pt supported on the carrier.

6 Claims, 4 Drawing Sheets

(51) Int. Cl.
  *F01N 3/28*   (2006.01)
  *B01J 23/63*  (2006.01)
  *B01D 53/94*  (2006.01)
  *F01N 13/00*  (2010.01)
  *B01J 37/02*  (2006.01)
  *B01J 35/00*  (2006.01)
  *F01N 3/10*   (2006.01)
  *F01N 3/021*  (2006.01)
  *B01J 35/04*  (2006.01)
  *B01J 23/42*  (2006.01)
  *B01J 23/44*  (2006.01)
  *B01J 23/46*  (2006.01)

(52) U.S. Cl.
  CPC ............... *B01J 23/42* (2013.01); *B01J 23/44* (2013.01); *B01J 23/464* (2013.01); *B01J 23/63* (2013.01); *B01J 35/0006* (2013.01); *B01J 35/04* (2013.01); *B01J 37/0244* (2013.01); *F01N 3/021* (2013.01); *F01N 3/0222* (2013.01); *F01N 3/035* (2013.01); *F01N 3/101* (2013.01); *F01N 3/105* (2013.01); *F01N 3/2803* (2013.01); *F01N 3/2828* (2013.01); *F01N 3/2892* (2013.01); *F01N 13/0097* (2014.06); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/904* (2013.01); *B01D 2255/9032* (2013.01); *B01D 2255/9155* (2013.01); *B01D 2257/404* (2013.01); *B01D 2257/502* (2013.01); *B01D 2257/702* (2013.01); *F01N 2510/068* (2013.01); *F01N 2510/0682* (2013.01)

(56) References Cited

U.S. PATENT DOCUMENTS

2016/0279571 A1    9/2016  Tsuji et al.
2017/0296969 A1 * 10/2017  Ohashi et al. ........ F01N 13/009

FOREIGN PATENT DOCUMENTS

| JP | 2008-151100 A | | 7/2008 | |
| JP | -2008151100 A | * | 7/2008 | |
| JP | 2008151100 A | * | 7/2008 | |
| JP | 2009-082915 A | | 4/2009 | |
| JP | 2012-240007 A | | 12/2012 | |
| JP | 2012240007 A | * | 12/2012 | |
| JP | 2013500857 A | | 1/2013 | |
| JP | 2016-078016 A | | 5/2016 | |
| WO | 2011015615 A1 | | 2/2011 | |
| WO | 2015/087816 A1 | | 6/2015 | |
| WO | WO-2016056573 A1 | * | 4/2016 | .............. B01J 23/63 |

OTHER PUBLICATIONS

Ogura, Y. (JP2008151100A)—translated document (Year: 2008).*
Jun. 13, 2017 International Search Report issued in International Patent Application No. PCT/JP2017/011150.
Feb. 18, 2019 extended Search Report issued in European Patent Application No. 17778953.4.
Jul. 11, 2019 Office Action issued in Japanese Patent Application No. 2016077475.

* cited by examiner

EXHAUST GAS PURIFICATION DEVICE

TECHNICAL FIELD

The present invention relates to an exhaust gas purification device. More particularly, the present invention relates to an exhaust gas purification device that purifies exhaust gas emitted by an internal combustion engine such as a gasoline engine.

The present international application claims priority based on Japanese Patent Application No. 2016-077475, filed on Apr. 7, 2016, the entire contents of which are incorporated in the present description by reference.

BACKGROUND ART

Generally, exhaust gas emitted by internal combustion engines contains PM (particulate matter) having carbon as a main component, as well as ash made up of unburned components, which are known to give rise to air pollution. Regulations concerning emissions of particulate matter have therefore become stricter year after year, alongside regulations on harmful components in exhaust gas such as hydrocarbons (HC), carbon monoxide (CO), and nitrogen oxides (NOx). In this respect, various technologies for trapping and removing such particulate matter from exhaust gas have been proposed.

For instance, particulate filters for trapping such particulate matter are provided in the exhaust passage of internal combustion engines. In gasoline engines, for example, a certain amount of particulate matter, though smaller than that in diesel engines, is emitted together with exhaust gas, and a gasoline particulate filter (GPF) may in some cases be fitted in the exhaust passage. Such particulate filters include known filters having a structure, referred to as of wall-flow type, in which a substrate is configured of multiple cells made up of a porous substance, and in which the inlets and the outlets of the multiple cells are plugged alternately (Patent Literature 1 and 2). In a wall-flow-type particulate filter, exhaust gas that flows in through cell inlets passes through a partitioning porous cell partition wall, and is discharged out through the cell outlets. As the exhaust gas passes through the porous cell partition wall, the particulate matter becomes trapped within the pores inside the partition wall.

CITATION LIST

Patent Literature

Patent Literature 1: Japanese Patent Application Publication No. 2007-185571
Patent Literature 2: Japanese Patent Application Publication No. 2009-82915

SUMMARY

Technical Problem

Approaches involving supporting a noble metal catalyst on the above particulate filters have been studied in recent years with a view to further increasing purification performance. For instance, Patent Literature 1 discloses an exhaust gas purification catalyst in which platinum (Pt) and rhodium (Rh) as noble metal catalysts are supported separately inside a partition wall. Further, Patent Literature 2 discloses an exhaust gas purification catalyst in which a palladium (Pd) layer as a noble metal catalyst is disposed inside a partition wall, and a rhodium (Rh) layer is laid on the surface of the partition wall.

In the exhaust gas purification catalyst of Patent Literature 1, however, Pt and Rh are supported in the same manner from the inlet side to the outlet side, as viewed in the length direction of the substrate (axial direction of the substrate), from the exhaust gas inlet side towards the outlet side. Therefore, sintering (grain bonding) of Pt and Rh occurs when the catalyst is exposed to high temperature. The purification performance on exhaust gas may drop as a result. In the exhaust gas purification catalyst of Patent Literature 2, Pd and Rh are disposed inside and outside the partition wall, respectively, and thus sintering between Pd and Rh can be suppressed. The Rh layer is disposed outside the partition wall, however, and thus exhaust gas does not flow readily, and there is a greater loss of pressure (hereafter also referred to as pressure loss), which is a drawback. Conventional configurations have thus room for improvement as regards combining enhanced purification performance with reductions in pressure loss.

Exhaust gas purification catalysts have generally a drawback in that the purification performance of the catalyst is low, on account of insufficient warm-up, when the exhaust gas temperature is still low, for instance immediately after engine start-up. In particular, exhaust gas at low temperature contains a large amount of HC being unburned substances of fuel. Accordingly, exhaust gas purification catalysts are demanded that allow bringing out good HC purification performance in a low-temperature state immediately after engine start-up.

It is a main object of the present invention, arrived at in the light of the above considerations, to provide an exhaust gas purification device provided with a particulate filter of wall-flow structure type and in which purification performance on exhaust gas (in particular purification performance at low temperature) can be enhanced while reducing pressure loss.

Solution to Problem

The exhaust gas purification device according to the present invention is an exhaust gas purification device which is disposed in an exhaust passage of an internal combustion engine and which purifies exhaust gas emitted by the internal combustion engine. The device is provided with: a substrate of wall-flow structure having an inlet cell in which only an exhaust gas inflow end section is open, an outlet cell which is adjacent to the inlet cell and in which only an exhaust gas outflow end section is open, and a porous partition wall that partitions the inlet cell and the outlet cell from each other; an upstream catalyst layer provided inside the partition wall; and a downstream catalyst layer provided inside the partition wall. The upstream catalyst layer is disposed in an upstream portion of the substrate in a direction of exhaust gas flow, the upstream portion including the exhaust gas inflow end section. The downstream catalyst layer is disposed in a downstream portion of the substrate in the direction of exhaust gas flow, the downstream portion including the exhaust gas outflow end section. The downstream catalyst layer contains a carrier, and Rh supported on the carrier. The upstream catalyst layer contains a carrier, and Pd and/or Pt supported on the carrier.

In this exhaust gas purification device, a plurality of noble metals (for instance Pd and Rh) is supported separately between an upstream portion (upstream catalyst layer) and a downstream portion (downstream catalyst layer) of the partition wall, and hence sintering of the noble metals with each other is effectively suppressed. Degradation of the catalyst is suppressed as a result also when the catalyst is exposed to high temperature. Both the upstream catalyst layer and the downstream catalyst layer are disposed inside the partition wall, and hence the exhaust gas flows more readily than in the case where the catalyst layers are formed on the surface (outside) the partition wall. Flow channel resistance is lowered as a result, and pressure can be reduced thereby. Therefore, the present configuration allows providing an exhaust gas purification device boasting significantly enhanced purification performance on exhaust gas (in particular, purification performance at low temperature), while reducing pressure loss.

In a preferred aspect of the exhaust gas purification device disclosed herein, a proportion of a coating amount of the upstream catalyst layer is 30% to 60%, with respect to 100% as a total of the coating amount of the upstream catalyst layer and a coating amount of the downstream catalyst layer per L of volume of the substrate. The above-described effect can be brought out yet better when the coating amount of the upstream catalyst layer lies within the above range.

In a preferred aspect of the exhaust gas purification device disclosed herein, the upstream catalyst layer is formed in a portion corresponding to 20% to 80% of a length of the substrate, from the exhaust gas inflow end section of the substrate towards the downstream side. Further, the downstream catalyst layer is formed in a portion corresponding to 20% to 80% of the length of the substrate, from the exhaust gas outflow end section of the substrate towards the upstream side. Within these ranges of the lengths of the upstream catalyst layer and of the downstream catalyst layer, it becomes possible to achieve a greater degree of enhancement of purification performance and of reduction in pressure loss. In a preferred aspect, the upstream catalyst layer is formed so as not to overlap the downstream catalyst layer, in the length direction of the substrate.

In a preferred aspect of the exhaust gas purification device disclosed herein, in a thickness direction of the partition wall, the upstream catalyst layer is unevenly distributed within the partition wall, so as to be in contact with the inlet cell and not in contact with the outlet cell, and the downstream catalyst layer is unevenly distributed within the partition wall, so as to be in contact with the outlet cell and not in contact with the inlet cell. In such a configuration, a plurality of noble metals (for instance, Pt and Rh) is supported separately in the thickness direction of the partition wall, and hence sintering of the noble metals with each other is suppressed more effectively. Further, the noble metals are disposed densely within the partition wall, and accordingly contact between the noble metals and the exhaust gas is good. Purification performance on exhaust gas can be further enhanced as a result.

In a preferred aspect of the exhaust gas purification device disclosed herein, the upstream catalyst layer is formed in a portion corresponding to 30% to 70% of the thickness of the partition wall, from a surface of the partition wall in contact with the inlet cell towards the outlet cell. Further, the downstream catalyst layer is formed in a portion corresponding to 30% to 70% of the thickness of the partition wall, from a surface of the partition wall in contact with the outlet cell towards the inlet cell. Within these ranges of the thickness of the upstream catalyst layer and of the downstream catalyst layer it becomes possible to achieve a greater degree of enhancement of purification performance and of reduction in pressure loss.

In a preferred aspect of the exhaust gas purification device disclosed herein, the internal combustion engine is a gasoline engine. The temperature of exhaust gas in gasoline engines is comparatively high, and PM does not deposit readily inside the partition wall. Accordingly, the above-described effect can be brought out more efficiently in a case where the internal combustion engine is a gasoline engine.

DESCRIPTION OF EMBODIMENTS

Preferred embodiments of the present invention will be explained below on the basis of drawings. Any features other than the features specifically set forth in the present description and which may be necessary for carrying out the present invention (for instance, general features pertaining to the arrangement of particulate filters in automobiles) can be regarded as instances of design matter for a person skilled in the art on the basis of known techniques in the technical field in question. The present invention can be realized on the basis of the disclosure of the present specification and common technical knowledge in the relevant technical field.

Figure 1:
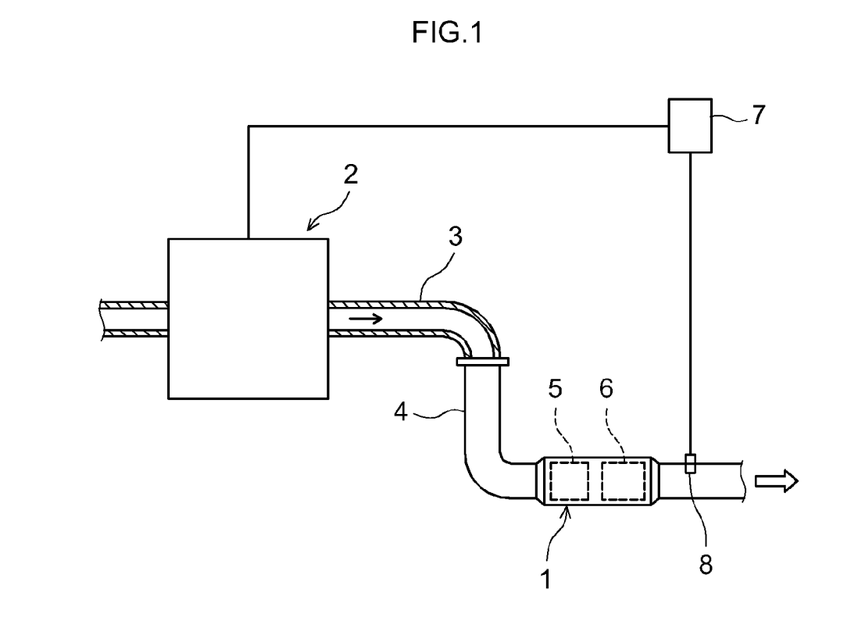
FIG. 1 is a diagram illustrating schematically an exhaust gas purification device according to an embodiment.

The configuration of an exhaust gas purification device according to one embodiment of the present invention will be explained first with reference to FIG. 1. An exhaust gas purification device 1 disclosed herein is provided in an exhaust system of the above internal combustion engine. FIG. 1 is a diagram illustrating schematically an internal combustion engine 2 and the exhaust gas purification device 1 that is provided in the exhaust system of the internal combustion engine 2.

An air-fuel mixture containing oxygen and fuel gas is supplied to the internal combustion engine (engine) according to the present embodiment. In the internal combustion engine the air-fuel mixture is burned, and the combustion energy is converted to mechanical energy. The burned air-fuel mixture becomes exhaust gas that is discharged to the exhaust system. The internal combustion engine 2 having the structure illustrated in FIG. 1 is configured mainly as a gasoline engine of an automobile.

The exhaust system of the engine 2 will be explained next. An exhaust manifold 3 is connected to an exhaust port (not shown) through which the engine 2 communicates with the exhaust system. The exhaust manifold 3 is connected to an exhaust pipe 4 through which exhaust gas flows. An exhaust passage of the present embodiment is formed by the exhaust manifold 3 and the exhaust pipe 4. The arrows in the figure denote the flow direction of the exhaust gas.

The exhaust gas purification device 1 disclosed herein is provided in the exhaust system of the engine 2. The exhaust gas purification device 1, which is equipped with a catalyst unit 5, a filter unit 6 and an ECU 7, purifies harmful components (for instance, carbon monoxide (CO), hydrocarbons (HC) and nitrogen oxides (NO$_x$)) contained in the exhaust gas that is emitted, and traps particulate matter (PM) contained in the exhaust gas.

The ECU 7 is a unit that carries out control between the engine 2 and the exhaust gas purification device 1, and has, as a constituent element, an electronic device such as a digital computer, similarly to common control devices. Typically, the ECU 7 is provided with an input port electrically connected to sensors (for instance, a pressure sensor 8) that are disposed at respective locations in the engine 2 and/or the exhaust gas purification device 1. Thereby, information detected at the respective sensors is transmitted via the input port to the ECU 7 in the form of electrical signals. The ECU 7 is also provided with an output port. The ECU 7, which is connected via the output port to respective sites of the engine 2 and of the exhaust gas purification device 1, controls the operation of the various members through transmission of control signals.

The catalyst unit 5, which is configured to be capable of purifying three-way components (NOx, HC and CO) contained in the exhaust gas, is provided in the exhaust pipe 4 that communicates with the engine 2. Specifically, the catalyst unit 5 is provided downstream of the exhaust pipe 4, as illustrated in FIG. 1. The type of the catalyst unit 5 is not particularly limited. The catalyst unit 5 may be for instance a catalyst that supports a noble metal such as platinum (Pt), palladium (Pd) or rhodium (Rd). A downstream catalyst unit may be further disposed in the exhaust pipe 4, downstream of the filter unit 6. The specific configuration of the catalyst unit 5 is not a characterizing feature of the present invention, and will not be explained in detail herein.

The filter unit 6 is provided downstream of the catalyst unit 5. The filter unit 6 has a gasoline particulate filter (GPF) capable of trapping and removing particulate matter (hereafter, "PM" for short) present in the exhaust gas. The particulate filter according to the present embodiment will be explained below in detail.

Figure 2:
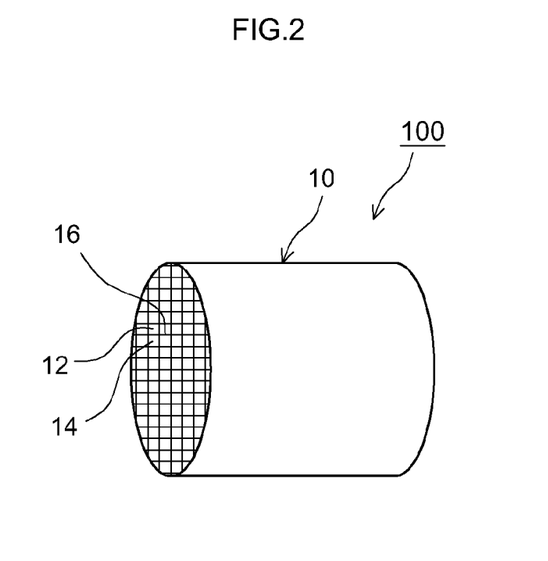
FIG. 2 is a perspective-view diagram illustrating schematically a filter of an exhaust gas purification device according to an embodiment.
Figure 3:
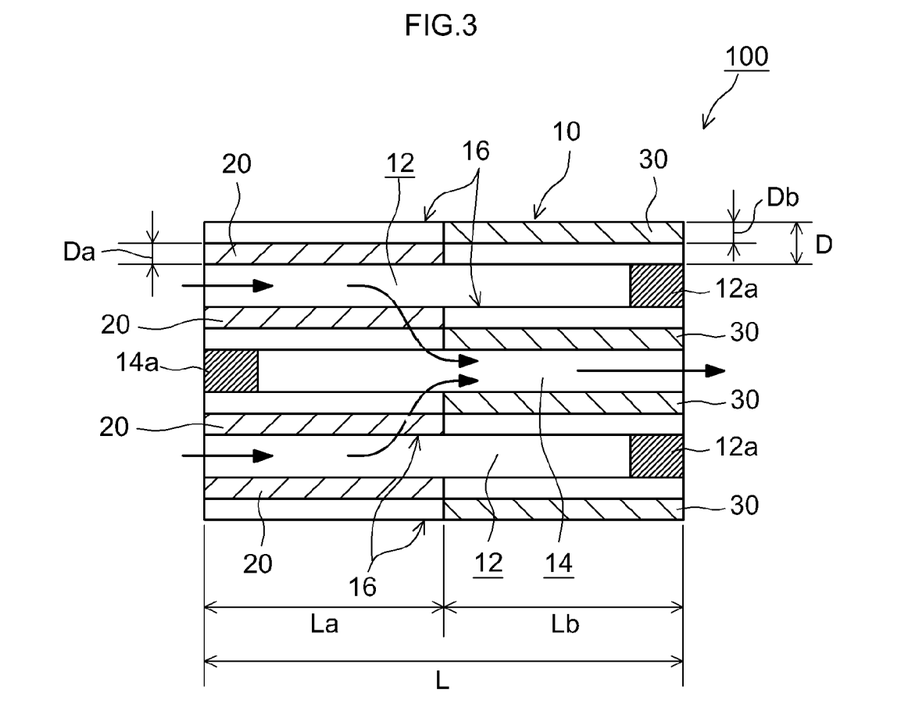
FIG. 3 is a cross-sectional diagram illustrating schematically a filter cross-section of an exhaust gas purification device according to an embodiment.

FIG. 2 is a perspective-view diagram of a particulate filter 100. FIG. 3 is a schematic diagram of an enlargement of part of a cross-section of the particulate filter 100, cut in the axial direction. As illustrated in FIG. 2 and FIG. 3, the particulate filter 100 is provided with a substrate 10 having a wall-flow structure, an upstream catalyst layer 20 and a downstream catalyst layer 30. The substrate 10, the upstream catalyst layer 20 and the downstream catalyst layer 30 will be explained next in this order.

<Substrate 10>

As the substrate 10 there can be used conventional substrates of various materials and forms that are used in this kind of applications. For instance, substrates formed out of a ceramic such as cordierite or silicon carbide (SiC), or out of an alloy (stainless steel or the like), can be suitably used herein. Illustrative examples include substrates having a cylindrical outer shape (the present embodiment). However, an elliptic cylinder shape or polygonal cylinder shape may be adopted, instead of a cylinder, as the outer shape of the substrate as a whole. The substrate 10 has inlet cells 12 in each of which only an exhaust gas inflow end section is open, outlet cells 14 each of which is adjacent to the inlet cell 12 and in each of which only an exhaust gas outflow end section is open, and a porous partition wall 16 that partitions the inlet cells 12 and the outlet cells 14 from each other.

<Inlet Cells 12 and Outlet Cells 14>

In each of the inlet cells 12 only the exhaust gas inflow end section is open. In each of the outlet cells 14, which are adjacent to the inlet cells 12, only the exhaust gas outflow end section is open. In the present embodiment, the exhaust gas outflow end section of the inlet cells 12 is plugged by a sealing section 12a, and the exhaust gas inflow end section of the outlet cells 14 is plugged by a sealing section 14a. The inlet cells 12 and the outlet cells 14 may be set to have an appropriate shape and size, taking into consideration the flow rate and components of the exhaust gas that is supplied to the filter 100. For instance, the inlet cells 12 and the outlet cells 14 may adopt various geometrical shapes such as a rectangular shape including squares, parallelograms, rectangles and trapezoids, and also triangular and other polygonal shapes (for instance, hexagons and octagons), as well as circular shapes.

<Partition Wall 16>

The partition wall 16 is formed between the inlet cells 12 and the outlet cells 14 being adjacent to each other. The inlet cells 12 and the outlet cells 14 are partitioned by the partition wall 16. The partition wall 16 has a porous structure that allows exhaust gas to pass therethrough. The porosity of the partition wall 16 is not particularly limited, but is appropriately set to about 50% to 70%, and is preferably 55% to 65%. When the porosity of the partition wall 16 is excessively low, PM may slip therethrough; when by contrast the porosity of the partition wall 16 is excessively high, the mechanical strength of the filter 100 tends to drop, all of which is undesirable. The thickness of the partition wall 16 is not particularly limited, but may be of about 200 μm to 800 μm. Within such a range of partition wall thickness, it becomes possible to achieve the effect of suppressing increases in pressure loss without compromising PM trapping efficiency.

<Upstream Catalyst Layer 20>

As illustrated in FIG. 3, the upstream catalyst layer 20 is provided inside the partition wall 16. The upstream catalyst layer 20 is disposed in an upstream portion of the substrate 10 including the exhaust gas inflow end section. The upstream catalyst layer 20 is provided with a carrier (not shown) and with a noble metal (not shown) that is supported on the carrier.

In the present embodiment, the upstream catalyst layer 20 is formed in a portion (½L) corresponding to 50% of the length L of the substrate 10, from the exhaust gas inflow end section of the substrate 10 towards the downstream side. The upstream catalyst layer 20 is unevenly distributed within the partition wall 16 in such a manner that the upstream catalyst layer 20 is in contact with the inlet cells 12 and not in contact with the outlet cells 14, in the thickness direction of the partition wall 16. In the present embodiment, the upstream catalyst layer 20 is formed in a portion (½D) corresponding to 50% of the thickness D of the partition wall 16, from the surface of the partition wall 16 in contact with the inlet cells 12 towards the outlet cells 14.

The upstream catalyst layer 20 contains palladium (Pd) and/or platinum (Pt) as the noble metal. Herein Pd and Pt contribute mainly to purification performance on carbon monoxide (CO) and hydrocarbons (HC). The warm-up performance of the catalyst can be increased by incorporating Pd and/or Pt into the upstream catalyst layer 20. As a result, high catalytic activity is brought out even in a low-temperature state immediately after engine start-up, and it becomes possible to satisfactorily purify harmful substances (for instance HC) in the exhaust gas. The upstream catalyst layer 20 may contain a noble metal other than Pd, Pt and Rh. For instance ruthenium (Ru), iridium (Ir), osmium (Os) or the like can be used as the noble metal other than Pd, Pt and Rh.

The upstream catalyst layer 20 is formed by supporting the noble metal (Pd and/or Pt) on the carrier. The carrying amount of the noble metal by the carrier is not particularly limited, but an appropriate range is 0.01 mass % to 10 mass % (for instance 0.1 mass % to 3 mass %, and typically 0.5 mass % to 2 mass %) with respect to the total mass of the carrier that supports the noble metal in the upstream catalyst layer 20. The catalytic activity obtained from the noble metal can be insufficient when the amount of the noble metal is excessively small. An excessive carrying amount of the noble metal, on the other hand, results in likelier grain growth in the noble metal, and is at the same time disadvantageous in terms of cost.

Examples of the carrier that supports the noble metal (Pd and/or Pt) include metal oxides such as alumina ($Al_2O_3$), zirconia ($ZrO_2$), ceria ($CeO_2$), silica ($SiO_2$), magnesia (MgO) and titanium oxide (titania: $TiO_2$), and solid solutions of the foregoing (for instance, a ceria-zirconia ($CeO_2$—$ZrO_2$) complex oxide). A ceria-zirconia complex oxide is preferably used among the foregoing. Two or more types of the above carriers may be used concomitantly. Other materials (typically inorganic oxides) may be added, as an auxiliary component, to the carrier. Rare earth elements such as lanthanum (La) and yttrium (Y), alkaline earth elements such as calcium, as well as other transition metal elements can be used herein as substances that can be added to the carrier. Among the foregoing, rare earth elements such as lanthanum and yttrium allow increasing the specific surface area at high temperature without impairing catalytic function, and hence are suitably used as stabilizers.

The shape (outer shape) of the carrier is not particularly limited, but the carrier is preferably powdery, from the viewpoint of securing a yet greater specific surface area. For instance, the average particle size of the carrier (average particle size measured by laser diffraction-scattering) is preferably 8 µm or smaller (for instance, 4 µm to 7 µm). An excessively large average particle size of the carrier is undesirable since in that case the dispersibility of the noble metal supported on the carrier tends to drop, and the purification performance of the catalyst to decrease. On the other hand, an excessively small average particle size of the carrier is likewise undesirable since in that case there decreases the heat resistance of a carrier itself made up of the above carrier, and the heat resistance characteristic of the catalyst decreases as a result. Hence, it is ordinarily preferable to use a carrier having an average particle size of about 3 µm or greater (for instance, 4 µm or greater).

The method for supporting the noble metal on the carrier is not particularly limited. For instance, a carrier supporting a noble metal can be prepared by impregnating the carrier with an aqueous solution that contains a noble metal salt (for instance, a nitrate) or a noble metal complex (for instance, a tetraammine complex), followed by drying and firing.

Besides the above-described carrier having a noble metal supported thereon, a promoter supporting no noble metal can be added to the upstream catalyst layer 20 disclosed herein. Examples of promoters include alumina and silica ($SiO_2$). Ordinarily, the content of the promoter (for instance alumina) with respect to 100 mass % as the total of noble metal, carrier plus the promoter, is appropriately of 20 mass % to 80 mass %, and is preferably for instance of 30 mass % to 70 mass %.

Barium may be added to the upstream catalyst layer 20 disclosed herein. Poisoning of the noble metal is suppressed, and catalytic activity enhanced, through addition of barium. Increased noble metal dispersibility entails better inhibition of sintering that accompanies grain growth in the noble metal at high temperature. The durability of the catalyst can be enhanced as a result. The addition amount of barium to the upstream catalyst layer 20 disclosed herein satisfies preferably 10 mass % to 15 mass %, and particularly preferably satisfies 12 mass % to 15 mass %, with respect to the total mass of the upstream catalyst layer 20 excluding barium (i.e. total of Pt, carrier and metal oxide particles). The upstream catalyst layer 20 having barium added thereto can be produced for instance by preparing a barium aqueous solution in which a water-soluble barium salt (for instance, barium sulfate) is dissolved in water (typically deionized water), and adding then the resulting barium aqueous solution to a carrier or the like, followed by firing.

The coating amount of the upstream catalyst layer 20 is not particularly limited, but it is appropriately set to be about 350 g/L or less per L of volume of substrate. The coating amount of the upstream catalyst layer 20 is preferably 300 g/L or less, more preferably 250 g/L or less and yet more preferably 200 g/L or less, for instance from the viewpoint of reducing pressure loss. For instance the coating amount of the upstream catalyst layer 20 may be 130 g/L or less, and typically 120 g/L or less. The lower limit of the coating amount of the upstream catalyst layer 20 is not particularly restricted, and may be 60 g/L or more, more preferably 70 g/L or more, and yet more preferably 90 g/L or more, for instance from the viewpoint of enhancing purification performance. For instance the coating amount of the upstream catalyst layer 20 may be 100 g/L or more, typically 110 g/L or more.

In a preferred embodiment, the proportion of the coating amount of the upstream catalyst layer 20 is 20% to 80%, with respect to 100% as the total of the coating amount of the upstream catalyst layer 20 and the coating amount of the downstream catalyst layer 30 per L of volume of substrate. Such a proportion of the coating amount of the upstream catalyst layer 20 translates into a suitable balanced ratio of upstream catalyst layer 20 and downstream catalyst layer 30, and as a result the above-described effect can be brought out at a higher level (for instance effect of enhancing the low-temperature activity (warm-up performance) of the catalyst). The art disclosed herein can be preferably implemented in an embodiment where for instance the proportion of the coating amount of the upstream catalyst layer 20 with respect to the total coating amount of the upstream catalyst layer 20 plus the downstream catalyst layer 30 is 30% to 60% (for instance 35% to 55%, typically 40% to 50%, and for instance less than 50%).

In a preferred embodiment, the coating amount of the upstream catalyst layer 20 per L of volume of substrate is smaller than the coating amount of the downstream catalyst layer 30 per L of volume of substrate. By setting thus the coating amount of the upstream catalyst layer 20 to be smaller than the coating amount of the downstream catalyst layer 30, the exhaust gas flows preferentially in the upstream portion of the partition wall 16. As a result, the flow of exhaust gas from the inlet cells 12 up to the outlet cells 14 becomes smoother, and pressure loss can be further reduced. For instance, the following relationship is preferably satisfied $60 \leq X < Y \leq 140$, where X g/L denotes the coating amount of the upstream catalyst layer 20 per L of volume of substrate and Y g/L denotes the coating amount of the downstream catalyst layer 30 per L of volume of substrate.

The coating amount X of the upstream catalyst layer 20 per L of volume of substrate is preferably smaller by 20 g/L or more, more preferably smaller by 30 g/L or more, and yet more preferably smaller by 40 g/L or more than the coating amount Y of the downstream catalyst layer 30 per L of volume of substrate, from the viewpoint of better eliciting the effect described above. A value obtained by subtracting the coating amount X of the upstream catalyst layer 20 per L of volume of substrate from the coating amount Y of the downstream catalyst layer 30 per L of volume of substrate (i.e. Y−X) is preferably 70 g/L or less, more preferably 60 g/L or less, yet more preferably 55 g/L or less, and particularly preferably 50 g/L or less. For instance Y−X may be set to 45 g/L or less.

The upstream catalyst layer 20 can be formed by coating the interior of the partition wall 16 with a slurry (typically through suction coating of the slurry under reduced pressure) that contains a powder resulting from supporting the noble metal on the carrier, and the above metal oxide powder. In the process of forming the upstream catalyst layer 20 by coating, a binder may be incorporated into the slurry, in order to properly bring the slurry into close contact with the interior of the partition wall 16. For instance an alumina sol or silica sol is preferably used as the binder. The viscosity of the slurry may be adjusted as appropriate so as to allow the slurry to flow easily into the partition wall 16 of the substrate 10. The inflow amount of the slurry may be adjusted as appropriate in accordance with the volume of the substrate 10 and the coating amount of the upstream catalyst layer 20 in such a manner that the injected slurry dwells properly inside the partition wall 16 of the substrate 10.

<Downstream Catalyst Layer 30>

The downstream catalyst layer 30 is provided inside the partition wall 16. The downstream catalyst layer 30 is disposed in a downstream portion of the substrate 10 including the exhaust gas outflow end section. The downstream catalyst layer 30 is provided with a carrier (not shown) and a noble metal (not shown) that is supported on the carrier.

In the present embodiment, the downstream catalyst layer 30 is formed in a portion (½L) corresponding to 50% of the length L of the substrate 10, from the exhaust gas outflow end section of the substrate 10 towards the upstream side. The downstream catalyst layer 30 is unevenly distributed within the partition wall 16 in such a manner that the downstream catalyst layer 30 is in contact with the outlet cells 14 and not in contact with the inlet cells 12, in the thickness direction of the partition wall 16. In the present embodiment, the downstream catalyst layer 30 is formed in a portion (½D) corresponding to 50% of the thickness D of the partition wall 16, from the surface of the partition wall 16 in contact with the outlet cells 14 towards the inlet cells 12.

The downstream catalyst layer 30 contains Rh as the noble metal. Herein Rh contributes mainly to purification performance on NOx (reduction purification capacity). Accordingly, harmful substances (for instance NOx) in the exhaust gas can be satisfactorily purified by incorporating Rh into the downstream catalyst layer 30. The downstream catalyst layer 30 may contain a noble metal other than Rh, Pt and Pd. For instance ruthenium (Ru), iridium (Ir), osmium (Os) or the like can be used as the noble metal other than Rh, Pt and Pd.

The downstream catalyst layer 30 is formed by supporting Rh on a carrier. The carrying amount of Rh by the carrier is not particularly limited, but an appropriate range is 0.01 mass % to 5 mass % (for instance 0.05 mass % to 3 mass %, and typically 0.1 mass % to 1 mass %) with respect to the total mass of the carrier that supports the noble metal in the downstream catalyst layer 30. The catalytic activity obtained from Rh is insufficient when the amount of Rh is excessively small. An excessive carrying amount of Rh, on the other hand, results in likelier grain growth in Rh, and is at the same time disadvantageous in terms of cost.

Examples of the carrier that supports Rh include metal oxides such as alumina ($Al_2O_3$), zirconia ($ZrO_2$), ceria ($CeO_2$), silica ($SiO_2$), magnesia (MgO) and titanium oxide (titania: $TiO_2$), and solid solutions of the foregoing (for instance, a ceria-zirconia ($CeO_2$—$ZrO_2$) complex oxide). Alumina is preferably used among the foregoing. Two or more types of the above carriers may be used concomitantly. Other materials (typically inorganic oxides) may be added, as an auxiliary component, to the carrier. Rare earth elements such as lanthanum (La) and yttrium (Y), alkaline earth elements such as calcium, as well as other transition metal elements can be used herein as substances that can be added to the carrier. Among the foregoing, rare earth elements such as lanthanum and yttrium allow increasing the specific surface area at high temperature without impairing catalytic function, and hence are suitably used as stabilizers.

The shape (outer shape) of the carrier is not particularly limited, but the carrier is preferably powdery, from the viewpoint of securing a yet greater specific surface area. For instance, the average particle size of the carrier (average particle size measured by laser diffraction-scattering) is preferably 8 μm or smaller (for instance, 4 μm to 7 μm). An excessively large average particle size of the carrier is undesirable since in that case the dispersibility of the noble metal supported on the carrier tends to drop, and the purification performance of the catalyst to decrease. On the other hand, an excessively small average particle size of the carrier is undesirable since in that case there decreases the heat resistance of a carrier itself made up of the above carrier, and the heat resistance characteristic of the catalyst decreases as a result. Hence, it is ordinarily preferable to use a carrier having an average particle size of about 3 μm or greater (for instance, 4 μm or greater).

The method for supporting the Rh on the carrier is not particularly limited. For instance, a carrier supporting Rh can be prepared by impregnating the carrier with an aqueous solution that contains a Rh salt (for instance, a nitrate) or a Rh complex (for instance, a tetraammine complex), followed by drying and firing.

Besides the above-described carrier having Rh supported thereon, a promoter supporting no noble metal can be added to the downstream catalyst layer 30 disclosed herein. Examples of the promoter include ceria-zirconia ($CeO_2$—$ZrO_2$) complex oxides, and silica ($SiO_2$). In particular ceria-zirconia complex oxide is preferably used herein. Ordinarily, the content of the promoter with respect to 100 mass % as the total of Rh, carrier plus the promoter is appropriately of 20 mass % to 80 mass %, and is preferably for instance of 30 mass % to 70 mass %.

The coating amount of the downstream catalyst layer 30 is not particularly limited, but it is appropriately set to be about 300 g/L per L of volume of substrate. The coating amount of the downstream catalyst layer 30 is preferably 250 g/L or less, more preferably 200 g/L or less, and yet more preferably 150 g/L or less, for instance from the viewpoint of reducing pressure loss. For instance the coating amount of the downstream catalyst layer 30 may be 120 g/L or less, and typically 100 g/L or less. The lower limit of the coating amount of the downstream catalyst layer 30 is not particularly restricted, and may be preferably 40 g/L or more, more preferably 50 g/L or more, and yet more preferably 60 g/L or more, for instance from the viewpoint of enhancing purification performance. For instance the coating amount of the downstream catalyst layer 30 may be 80 g/L or more, typically 90 g/L or more.

The downstream catalyst layer 30 can be formed by coating the interior of the partition wall 16 with a slurry (typically through suction coating of the slurry under reduced pressure) that contains a powder resulting from supporting Rh on the carrier, and the above metal oxide powder. In the process of forming the downstream catalyst layer 30 by coating, a binder may be incorporated into the slurry, in order to properly bring the slurry into close contact with the interior of the partition wall 16. For instance an alumina sol or silica sol is preferably used as the binder. The viscosity of the slurry may be adjusted as appropriate so as to allow the slurry to flow easily into the partition wall 16 of the substrate 10. The inflow amount of the slurry may be adjusted as appropriate in accordance with the volume of the substrate 10 and the coating amount of the downstream catalyst layer 30 in such a manner that the injected slurry dwells properly inside the partition wall 16 of the substrate 10.

In this particulate filter 100, exhaust gas flows in through the inlet cells 12 of the substrate 10, as illustrated in FIG. 3. The exhaust gas having flowed in through the inlet cells 12 passes through the porous partition wall 16 and reaches the outlet cells 14. The arrows in FIG. 3 denote the route along which the exhaust gas that flows in through the inlet cells 12 reaches the outlet cells 14 by traversing the partition wall 16. The partition wall 16 has a porous structure; as the exhaust gas passes through the partition wall 16, therefore, the PM becomes trapped at the surface of the partition wall 16 and in the pores inside the partition wall 16. The upstream catalyst layer 20 and the downstream catalyst layer 30 are provided inside the partition wall 16, and hence harmful components in the exhaust gas are purified as the exhaust gas passes through the interior of and over the surface of the partition wall 16. The exhaust gas that has reached the outlet cells 14 through the partition wall 16 is discharged out of the filter 100 through the opening on the exhaust gas outflow side.

In such a particulate filter 100, Pd and Rh are supported separately between the upstream portion (upstream catalyst layer 20) and the downstream portion (downstream catalyst layer 30) of the substrate 10. Sintering (grain bonding) between Pd and Rh is effectively suppressed as a result. In consequence, degradation of the catalyst is suppressed also when the catalyst is exposed to high temperature. Both the upstream catalyst layer 20 and the downstream catalyst layer 30 are disposed inside the partition wall 16, and hence the exhaust gas flows more readily than in the case where the catalyst layers 20 and 30 are formed on the surface (outside) the partition wall 16. Flow channel resistance is lowered as a result, and pressure can be reduced thereby. The present configuration allows providing therefore a particulate filter 100 boasting significantly enhanced purification performance on exhaust gas, while reducing pressure loss, and providing also an exhaust gas purification device 1 that is provided with the particulate filter 100.

In the present description, the wording "catalyst layer disposed inside the partition wall" signifies that the catalyst layer is present mainly in the interior of the partition wall, and not outside the partition wall (typically, on the surface). More specifically, for instance, the cross-section of the partition wall of the upstream catalyst layer is observed under an electronic microscope, and the total coating amount in a range of length of $\frac{1}{10}$ the length L (0.1 L) of the substrate from the exhaust gas inflow end section towards the downstream side is set to 100%. In this case, the above wording signifies that the coating amount fraction that is present inside the partition wall is typically 80% or higher, for instance 85% or higher, preferably 90% or higher, and further 95% or higher, and is in particular substantially 100%. This is therefore clearly distinguished from an instance where for example part of the catalyst layer, when arranged on the surface of the partition wall, penetrates unintentionally into the partition wall.

The upstream catalyst layer 20 may be formed in a portion corresponding to 20% to 80% (preferably, 50% to 70%, i.e. $\frac{1}{2}$ to $\frac{7}{10}$ of the substrate as a whole) of the length L of the substrate 10, from the exhaust gas inflow end section of the substrate 10 towards the downstream side. The downstream catalyst layer 30 may be formed in a portion corresponding to 20% to 80% (preferably, 30% to 50% i.e. $\frac{3}{10}$ to $\frac{1}{2}$ of the substrate as a whole) of the length L of the substrate 10, from the exhaust gas outflow end section of the substrate 10 towards the upstream side. In a preferred embodiment, the upstream catalyst layer 20 is formed so as not to overlap the downstream catalyst layer 30, in the length direction of the substrate 10. As a result, Rh and Pd are supported separately in the length direction of the substrate 10, and hence it becomes possible to suppress more effectively sintering of Rh and Pd (and suppress therefore catalyst degradation). In this case, preferably, the downstream catalyst layer 30 is formed in a portion other than the upstream catalyst layer 20, in the length direction of the substrate 10 (extension direction of the partition wall 16). For instance, there holds preferably La=0.2 L to 0.8 L, Lb=0.2 L to 0.8 L and La+Lb=L, where L is the total length of the substrate 10, La is the total length of the upstream catalyst layer 20 and Lb is the total length of the downstream catalyst layer 30. Within these ranges of the lengths La and Lb of the upstream catalyst layer 20 and of the downstream catalyst layer 30, it becomes possible to achieve a greater degree of enhancement of purification performance and of reduction in pressure loss.

In the present embodiment, the upstream catalyst layer 20 is unevenly distributed within the partition wall 16, so as to be in contact with the inlet cells 12 and not in contact with the outlet cells 14, in the thickness direction of the partition wall 16. The downstream catalyst layer 30 is unevenly distributed within the partition wall 16 so as be in contact with the outlet cells 14 and not in contact with the inlet cells 12. As a result, Rh and Pd are supported separately in the thickness direction of the partition wall 16, and hence it becomes possible to suppress more effectively sintering of Rh and Pd (and suppress therefore catalyst degradation). Contact between the exhaust gas and Rh and Pd is good since Rh and Pd are disposed densely within the partition wall 16. Purification performance on exhaust gas can be further enhanced as a result.

In this case, the upstream catalyst layer 20 may be formed in a portion corresponding to 30% to 100% of the thickness D of the partition wall 16, from the surface of the partition wall 16 in contact with the inlet cells 12 towards the outlet cells 14 (for instance, 30% to 70%, preferably 30% to 80%, more preferably 40% to 80%, i.e. $\frac{2}{5}$ to $\frac{4}{5}$ of the thickness of the partition wall). The downstream catalyst layer 30 may be formed in a portion corresponding to 30% to 100% of the thickness D of the partition wall 16, from the surface of the partition wall 16 in contact with the outlet cells 14 towards the inlet cells 12 (for instance, 30% to 70%, preferably 30% to 80%, more preferably 40% to 80% i.e. $\frac{2}{5}$ to $\frac{4}{5}$ of the thickness of the partition wall). In this case, the downstream catalyst layer 30 is preferably formed so as not to overlap the upstream catalyst layer 20 in the thickness direction of the partition wall 16. For instance, there holds preferably Da=0.3 D to 1.0 D, Db=0.3 D to 1.0 D and Da+Db≥D, where D is the thickness of the partition wall 16, Da is the thickness of the upstream catalyst layer 20, and Db is the thickness of the downstream catalyst layer 30. Within these ranges of the thickness Da and Db of the upstream catalyst layer 20 and of the downstream catalyst layer 30, it becomes possible to achieve a greater degree of enhancement of purification performance and of reduction in pressure loss.

Test examples pertaining to the present invention will be explained next, but the invention is not meant to be limited to the test examples illustrated below.

Example 1

A particulate filter containing Pd in the upstream catalyst layer and containing Rh in the downstream catalyst layer was produced. Specifically, there was prepared ceria-zirconia complex oxide as a carrier for upstream catalyst layer formation. The ceria-zirconia complex oxide was impregnated with a solution of Pd nitrate, as a noble metal catalyst solution, followed by evaporation to dryness, to prepare a Pd/ceria-zirconia complex oxide carrier powder supporting 1.91 mass % of Pd. Then a slurry A was prepared by mixing 62.2 parts by mass of the Pd/ceria-zirconia complex oxide carrier powder, 36.61 parts by mass of alumina, 18.32 parts by mass of $BaSO_4$, and deionized water. Next, this slurry A was applied through suction onto a portion of a cordierite substrate (wall-flow-type substrate illustrated in FIG. 2 and FIG. 3: diameter 103 mm, total length 100 mm) corresponding to 50% of the length L of the substrate from the exhaust gas inflow end section towards the downstream side, and onto a portion corresponding to 50% of the thickness of the partition wall 16, from the surface of the partition wall 16 in contact with the inlet cells 12 towards the outlet cells 14, followed by drying and firing, to thereby form the upstream catalyst layer 20 in the interior of the partition wall 16.

Next, alumina as a carrier for downstream catalyst layer formation was prepared and was impregnated with a Rh nitrate solution as a noble metal catalyst solution, followed by evaporation to dryness, to prepare a Rh/alumina carrier powder supporting 0.8 mass % of Rh. Then a slurry B was prepared through mixing of 36.9 parts by mass of the Rh/alumina carrier powder, 36.61 parts by mass of a ceria-zirconia complex oxide, and deionized water. Next, this slurry B was applied through suction onto a portion of the above substrate corresponding to 50% of the length L of the substrate from the exhaust gas outflow end section towards the upstream side, and onto a portion corresponding to 50% of the thickness of the partition wall 16, from the surface of the partition wall 16 in contact with the outlet cells 14 towards the inlet cells 12, followed by drying and firing, to thereby form the downstream catalyst layer 30 in the interior of the partition wall 16. In Example 1 the coating amount of the upstream catalyst layer per L of volume of substrate was set to 40 g/L, and the coating amount of the downstream catalyst layer was set to 160 g/L. In this case the proportion of the coating amount of the upstream catalyst layer with respect to the total coating amount of the upstream catalyst layer plus the downstream catalyst layer was 20%. A particulate filter provided with the upstream catalyst layer 20 and the downstream catalyst layer 30 was thus obtained.

Example 2

A particulate filter was produced in the same way as in Example 1, but herein the coating amount of the upstream catalyst layer per L of volume of substrate was set to 60 g/L, the coating amount of the downstream catalyst layer per L of volume of substrate was set to 140 g/L, and the proportion of the coating amount of the upstream catalyst layer with respect to the total coating amount of the upstream catalyst layer plus the downstream catalyst layer was set to 30%.

Example 3

A particulate filter was produced in the same way as in Example 1, but herein the coating amount of the upstream catalyst layer per L of volume of substrate was set to 80 g/L, the coating amount of the downstream catalyst layer per L of volume of substrate was set to 120 g/L, and the proportion of the coating amount of the upstream catalyst layer with respect to the total coating amount of the upstream catalyst layer plus the downstream catalyst layer was set to 40%.

Example 4

A particulate filter was produced in the same way as in Example 1, but herein the coating amount of the upstream catalyst layer per L of volume of substrate was set to 100 g/L, the coating amount of the downstream catalyst layer per L of volume of substrate was set to 100 g/L, and the proportion of the coating amount of the upstream catalyst layer with respect to the total coating amount of the upstream catalyst layer plus the downstream catalyst layer was set to 50%.

Example 5

A particulate filter was produced in the same way as in Example 1, but herein the coating amount of the upstream catalyst layer per L of volume of substrate was set to 120 g/L, the coating amount of the downstream catalyst layer per L of volume of substrate was set to 80 g/L, and the proportion of the coating amount of the upstream catalyst layer with respect to the total coating amount of the upstream catalyst layer plus the downstream catalyst layer was set to 60%.

Example 6

A particulate filter was produced in the same way as in Example 1, but herein the coating amount of the upstream catalyst layer per L of volume of substrate was set to 140 g/L, the coating amount of the downstream catalyst layer per L of volume of substrate was set to 60 g/L, and the proportion of the coating amount of the upstream catalyst layer with respect to the total coating amount of the upstream catalyst layer plus the downstream catalyst layer was set to 70%.

Example 7

For comparison, there was produced a particulate filter containing Rh in the upstream catalyst layer and containing Pd in the downstream catalyst layer. Specifically, the slurry B described above was applied through suction onto a portion of a cordierite substrate corresponding to 50% of the length L of the substrate, from the exhaust gas inflow end section towards the downstream side, and onto a portion corresponding to 50% of the thickness of the partition wall 16, from the surface of the partition wall 16 in contact with the inlet cells 12 towards the outlet cells 14, followed by drying and firing, to thereby form the upstream catalyst layer 20 in the interior of the partition wall 16. Next, the slurry A was applied through suction onto a portion of the above substrate corresponding to 50% of the length L of the substrate from the exhaust gas outflow end section towards the upstream side, and onto a portion corresponding to 50% of the thickness of the partition wall 16, from the surface of the partition wall 16 in contact with the outlet cells 14 towards the inlet cells 12, followed by drying and firing, to thereby form the downstream catalyst layer 30 in the interior of the partition wall 16. In Example 7 the coating amount of the upstream catalyst layer per L of volume of substrate was set to 120 g/L, and the coating amount of the downstream catalyst layer was set to 80 g/L. In this case the proportion of the coating amount of the upstream catalyst layer with respect to the total coating amount of the upstream catalyst layer plus the downstream catalyst layer was 60%.

Figure 4:
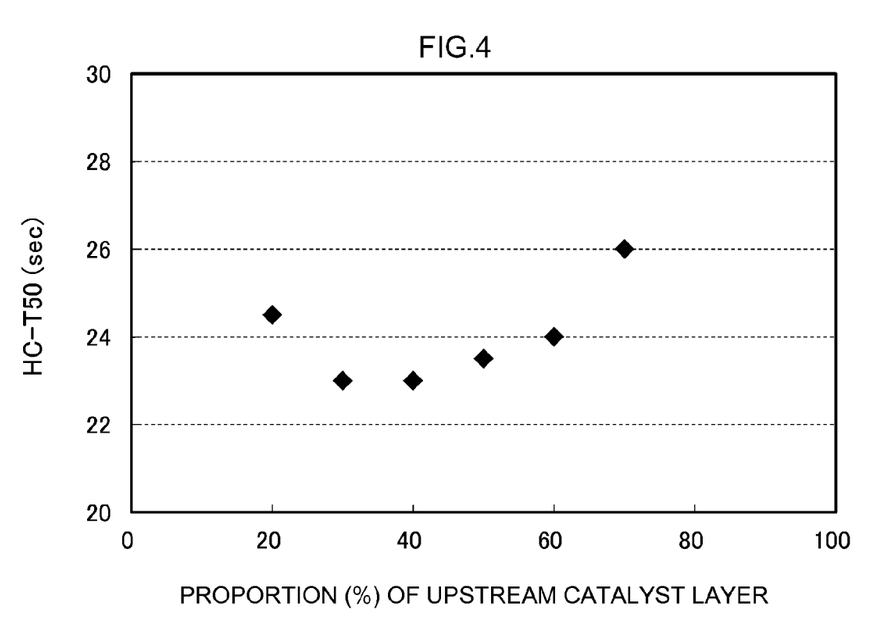
FIG. 4 is a graph illustrating the relationship between the proportion of coating amount of an upstream catalyst layer and HC 50% purification time.

The particulate filter of each example was disposed downstream of an engine, the purification rate of HC gas was measured under the conditions below, and the 50% purification time was also measured. Herein the 50% purification time denotes the time elapsed from the measurement start until the purification rate formed HC gas contained in the exhaust gas reaches 50%. This test can provide an indicator denoting the warm-up performance of the catalyst. Specifically, it is found that a shorter 50% purification time translates into better warm-up performance of the catalyst. The results are given in the column "HC-T50" of Table 1 and are depicted in FIG. 4. FIG. 4 is a graph, relating to Examples 1 to 6, illustrating the relationship between the proportion of the coating amount of the upstream catalyst layer with respect to the total coating amount of the upstream catalyst layer plus the downstream catalyst layer, and 50% purification time, for Examples 1 to 6.

[Measurement Conditions]
Sample loading temperature: 480±5° C.
Engine revolutions: 2400±10 rpm
Intake air amount: 24.0±0.5 g/s
A/F: stoichiometric
Starting temperature: 50±1° C.

TABLE 1

|  | Proportion (%) of upstream catalyst layer | HC-T50 (sec) |
| --- | --- | --- |
| Example 1 | 20 | 24.5 |
| Example 2 | 30 | 23.0 |
| Example 3 | 40 | 23.0 |
| Example 4 | 50 | 23.5 |
| Example 5 | 60 | 24.0 |
| Example 6 | 70 | 26.0 |
| Example 7 | 60 | 27.0 |

As Table 1 reveals, HC 50% purification time was shorter and warm-up performance better in Examples 1 to 6, in which Pd was disposed in the upstream catalyst layer and Rh was disposed in the downstream catalyst layer as compared with Example 7, in which the upstream catalyst layer contained Rh and downstream catalyst layer contained Pd. A comparison between Example 1 to Example 6 in FIG. 4 reveals that a very short 50% purification time, of 24 seconds or less (Example 2 to Example 5), can be reached in particular by setting the proportion of the coating amount of the upstream catalyst layer to 30% to 60%.

Several variations of the particulate filter 100 and the exhaust gas purification device 1 provided with the particulate filter 100 have been illustrated above, but the structures of the particulate filter 100 and of the exhaust gas purification device 1 are not limited to those of any of the embodiments described above.

In the embodiments described above, for instance, examples has been illustrated in which Pd is disposed in the upstream catalyst layer 20 and Rh is disposed is the downstream catalyst layer 30. However, the present invention is not limited to the examples. For instance Pt may be disposed in the upstream catalyst layer 20, and Rh may be disposed in the downstream catalyst layer 30. Alternatively, Pt may be incorporated into the upstream catalyst layer 20 along with Pd.

The shape and structure of the various members and sites of the exhaust gas purification device 1 may be modified. In the example illustrated in FIG. 1, the catalyst unit is provided upstream of the filter unit, but the catalyst unit may be omitted. The exhaust gas purification device 1 is particularly suitable as a device for purifying harmful components in exhaust gas having a comparatively high exhaust temperature, for instance in gasoline engines. However, the exhaust gas purification device 1 according to the present invention is not limited to being used to purify harmful components in exhaust gas of gasoline engines, and can be used in various applications that involve purifying harmful components in exhaust gas emitted by other engines (for instance, diesel engines).

INDUSTRIAL APPLICABILITY

The present invention allows providing an exhaust gas purification device in which purification performance on exhaust gas can be enhanced while reducing pressure loss.

The invention claimed is:

1. A gasoline engine exhaust gas purification device that is disposed in an exhaust passage of a gasoline engine and that purifies exhaust gas emitted by the gasoline engine, the device comprising:
    a substrate of wall-flow structure having an inlet cell in which only an exhaust gas inflow end section is open, an outlet cell which is adjacent to the inlet cell and in which only an exhaust gas outflow end section is open, and a porous partition wall that partitions the inlet cell and the outlet cell from each other;
    an upstream catalyst layer provided inside the partition wall, such that out of a total amount of the upstream catalyst layer provided on a surface of the partition wall and inside the partition wall, an amount of the upstream catalyst layer that is present inside the partition wall is 95% or higher of the total amount, and disposed in an upstream portion of the substrate in a direction of exhaust gas flow, the upstream portion including the exhaust gas inflow end section; and
    a downstream catalyst layer provided inside the partition wall, such that out of a total amount of the downstream catalyst layer provided on a surface of the partition wall and inside the partition wall, an amount of the upstream catalyst layer that is present inside the partition wall is 95% or higher of the total amount, and disposed in a downstream portion of the substrate in the direction of exhaust gas flow, the downstream portion including the exhaust gas outflow end section,
    wherein the downstream catalyst layer contains a first carrier, and Rh supported on the first carrier; and
    the upstream catalyst layer contains a second carrier, and at least one of Pd and Pt supported on the second carrier.

2. The exhaust gas purification device according to claim 1, wherein a proportion of a coating amount of the upstream catalyst layer is 30% to 60%, with respect to 100% as a total of the coating amount of the upstream catalyst layer and a coating amount of the downstream catalyst layer per L of volume of the substrate.

3. The exhaust gas purification device according to claim 1,
wherein the upstream catalyst layer is formed in a portion corresponding to 20% to 80% of a length of the substrate, from the exhaust gas inflow end section of the substrate towards the downstream side, and
the downstream catalyst layer is formed in a portion corresponding to 20% to 80% of the length of the substrate, from the exhaust gas outflow end section of the substrate towards the upstream side.

4. The exhaust gas purification device according to claim 1, wherein the upstream catalyst layer is formed so as not to overlap the downstream catalyst layer, in a length direction of the substrate.

5. The exhaust gas purification device according to claim 1,
wherein in a thickness direction of the partition wall, the upstream catalyst layer is unevenly distributed within the partition wall, so as to be in contact with the inlet cell and not in contact with the outlet cell, and
the downstream catalyst layer is unevenly distributed within the partition wall, so as to be in contact with the outlet cell and not in contact with the inlet cell.

6. The exhaust gas purification device according to claim 5,
wherein the upstream catalyst layer is formed in a portion corresponding to 30% to 70% of the thickness of the partition wall, from a surface of the partition wall in contact with the inlet cell towards the outlet cell, and
the downstream catalyst layer is formed in a portion corresponding to 30% to 70% of the thickness of the partition wall, from a surface of the partition wall in contact with the outlet cell towards the inlet cell.

* * * * *